Figure 1:
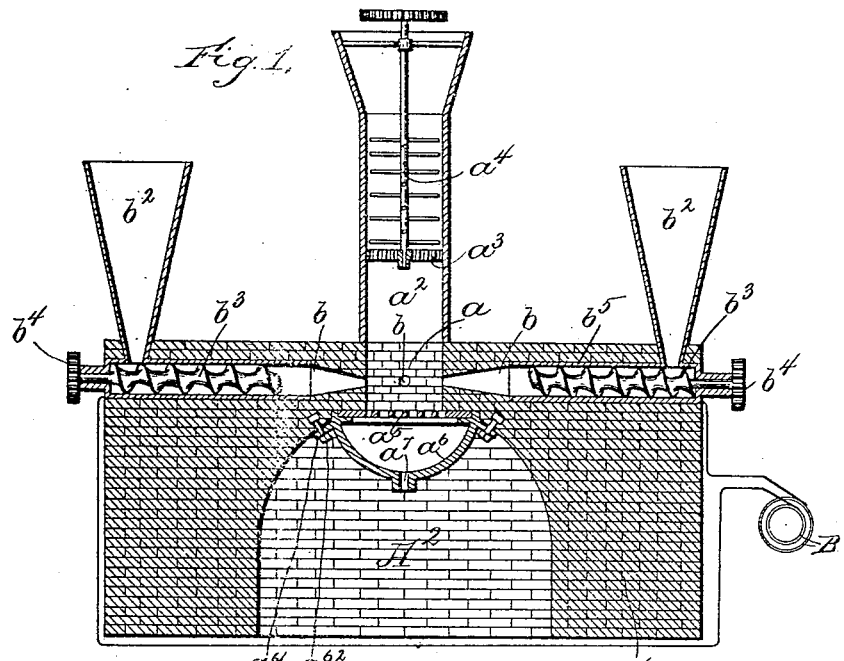

(No Model.)

E. R. WHITNEY.
PROCESS OF AND APPARATUS FOR PRODUCING CALCIUM CARBID.

No. 578,685. Patented Mar. 9, 1897.

Witnesses
Jas. J. Maloney.
H. J. Livermore

Inventor
Edwin R. Whitney
by Jos. P. Livermore
Atty.

United States Patent Office.

EDWIN R. WHITNEY, OF MANCHESTER, NEW HAMPSHIRE.

PROCESS OF AND APPARATUS FOR PRODUCING CALCIUM CARBID.

SPECIFICATION forming part of Letters Patent No. 578,685, dated March 9, 1897.

Application filed May 25, 1896. Serial No. 592,999. (No model.)

*To all whom it may concern:*

Be it known that I, EDWIN R. WHITNEY, of Manchester, county of Hillsborough, and State of New Hampshire, have invented an Improvement in Processes of and Apparatus for Producing Calcium Carbid, of which the following description, in connection with the accompanying drawings, is a specification, like letters on the drawings representing like parts.

The present invention relates to a process of and apparatus for producing calcium carbid; and it consists, mainly, in feeding a mixture of pulverized lime and carbon into a chamber or receptacle having two or more pairs of conductors extending radially toward the same, each pair of conductors being connected, respectively, to the terminals of a dynamo-electric machine or generator, (an alternating-current machine being preferably employed,) so that two or more arcs are formed within the chamber and adapted to cross each other therein.

In producing calcium carbid by smelting a mixture of lime or calcium-bearing material in the heat of the electric arc difficulty has been experienced, owing to the fact that the tendency of the current in the arc is to blow aside the particles of lime and carbon, so that only a portion thereof are properly subjected to heat, so as to fuse and combine. The present invention aims to obviate this difficulty, it having been found that by forming a plurality of arcs traversing in different directions the chamber into which the mixture is fed the tendency of one arc to blow aside the particles is overcome by the tendency of another arc traveling in a different direction, so that practically all the material fed to the chamber is subjected to the maximum heat, the result being that the carbid produced is very pure and free from particles of unchanged lime and carbon.

The invention further consists in an improved method of forming the terminals between which the arcs are drawn, charcoal being used for this purpose and forced into and through tubes terminating at the walls of the chamber within which the smelting takes place. The charcoal being forced through the said tubes into the chamber until a more or less imperfect contact is formed therein the resistance of the current generates sufficient heat to consume charcoal within the chamber, so that an arc is formed between the terminals. The charcoal is fed continuously to the devices which force the same into and through the tubes, so that the said tubes remain constantly full of carbon up to the mouths thereof, the chamber being of such size that the arc is capable of bringing the space from one side to the other thereof, and by this method the terminals are maintained always at practically the same distance from each other, since any portion of the conducting carbon extending into the chamber is at once consumed or fused and unites with the calcium forming part of the mixture fed to the said chamber, and is converted in conjunction therewith into calcium carbid. The bottom or lower wall of the chamber is provided with openings through which the liquid calcium carbid flows out when produced.

Figure 2:
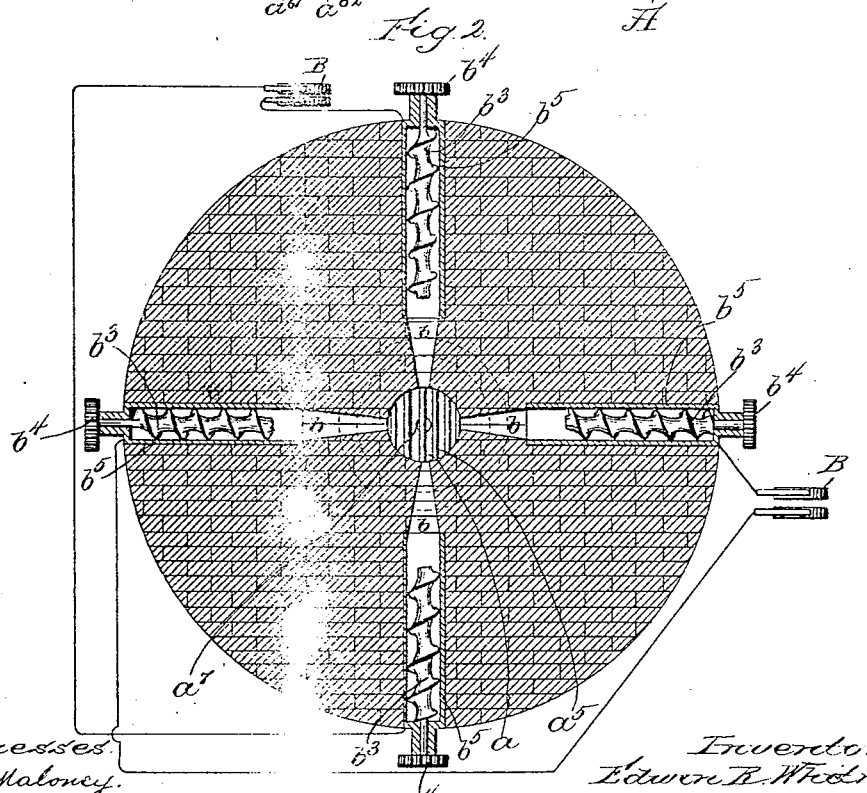

Figure 1 is a vertical cross-section of an apparatus embodying the invention and capable of carrying out the process which forms a part of said invention, and Fig. 2 is a longitudinal section of the same.

The chamber $a$ or smelting-chamber is preferably cylindrical in shape and formed in the top of a foundation A, which may be built up of brick or masonry, the said chamber being provided at the top with the feed-hopper $a^2$, having a foraminous transverse partition $a^3$, above which is a mixer $a^4$, consisting of a spindle mounted to rotate on a vertical axis and provided with arms or projections adapted to stir and agitate the particles of lime and carbon fed into the top of the hopper, so that the same are first thoroughly mixed and then sifted through the foraminous partition $a^3$, whence they fall into the smelting-chamber $a$.

The bottom of the chamber $a$ is closed by a grating $a^5$, through which the liquid calcium carbid formed by smelting the mixture fed through the hopper $a^2$ escapes into a collector $a^6$, having an opening $a^7$ at the bottom, through which the calcium carbid flows out into a space $A^2$, formed in the under side of the base A. The said receiver $a^6$ is preferably removable in order that the interior of the chamber may be reached for cleaning or repairing, the said receiver being herein shown as provided with a flange $a^{61}$, secured to the under side of the base A, as by bolts $a^{a_2}$. The grate $a^5$ is also preferably supported by the said receiver resting, as herein shown, upon an internally-projecting annular flange, so that when the said receiver is removed the grate may also be removed, leaving the interior of the chamber accessible. Extending radially toward the walls of said chamber are tubular passages $b$, adapted to contain the conductors, which consist of crushed and compacted charcoal, as will be described, there being a number of pairs of such tubes on opposite sides of the chamber, the tubes belonging to each pair being adapted to contain conductors connected, respectively, to the terminals of generators B, herein shown as alternating-current generators. There may be any number of pairs of tubes arranged in this way, two pairs being herein shown for convenience in illustrating the invention.

In order to form the conductors and maintain the terminals thereof at substantially a constant distance apart, each tube is provided near its outer end with a hopper $b^2$, adapted to receive charcoal fed thereto, so that the charcoal contained in said hopper will enter the tube, within which it is acted upon by the rotating screw or worm $b^3$, which carries it forward toward the mouth of the passage $b$, the said mouth being, as shown, contracted, so that the charcoal forced through the passage is crushed and compacted into a solid pencil, in which form it enters the chamber $a$. The said screws may be driven in any suitable way, being herein shown as provided with gear-wheels $b^4$, which can be connected to any suitable operating mechanism. The main portion of the chamber $a$, including the outlet portion of the passages $b$, is made of heat-resisting and infusible material, such as firebrick, and in order that the connection may be made between the carbon conductors and the dynamo-terminals the main portion of the tubular passages are each provided with a lining $b^5$, of conducting material, such as iron, to which the dynamo-terminals are connected, the electrical connections with the carbons being formed by the contact thereof with the walls of said metal linings, against which it is forced by the action of the screw.

In starting the operation the hoppers $b^2$ are filled with charcoal and the screw-operating mechanism started, so that a mass of charcoal is forced through each of the tubular passages toward the chamber $a$, there being a sufficient quantity of the charcoal forced into the said chamber through the end of the tube to form a high-resistance conductor, which, nevertheless, has sufficient conductivity to carry the current across from one terminal to the other, the resistance, however, being such as to produce heat enough to consume the charcoal within the chamber, so that an arc is practically instantaneously formed between the opposing terminals. The pressure to which the charcoal is subjected will in most cases produce sufficient coherence of the powdered charcoal to cause it to operate properly; but, if necessary, a binding material, such, for example, as tar or syrup, may be commingled with the charcoal to insure greater coherence of the crushed and compacted mass. The mixture of carbon and lime which is to be converted into calcium carbid is then fed through the hopper $a^2$ to the chamber $a$, within which it is smelted by the heat of the arc, the liquid calcium carbid produced by the fusing together of the elements running out through the grating $a^5$ into the receiver $a^6$ and through the opening $a^7$ to the space below the base A. When once started, it is obvious that the process will be continuous so long as the materials are fed to the hoppers.

Any suitable means may be provided for driving the screws $b^3$, it being preferable to provide some mechanism which can be regulated according to the current conditions of the dynamos, so as to hasten or retard the feed of the conductors, as is necessary.

By arranging the conductors so that two or more arcs are formed crossing each other from one side of the chamber to the other it is obvious that a great amount of heat is concentrated within said chamber, while the tendency of each arc to blow aside the particles of lime and carbon is counteracted by the presence of each other arc, so that practically every particle is subjected to the maximum heat, the smelting process being thus rendered thorough and the resulting carbid of a high degree of purity.

It is not intended to limit the invention to the specific construction and arrangement of apparatus herein shown and described, and so far as the said invention relates to the process it is not intended to be limited by any special apparatus, it being believed, however, that the apparatus herein shown is practicable and capable of carrying out the invention in a satisfactory way.

I claim—

1. The herein-described process of producing calcium carbid, which consists in mechanically compacting fragmentary charcoal into separate columns and moving said columns longitudinally toward each other, utilizing said columns as electric conductors for the formation of an arc between the ends thereof, and feeding a mixture of pulverized lime and pulverized charcoal into and through the said arc, substantially as described.

2. The herein-described process of producing calcium carbid, which consists in subjecting a moving mixture of pulverized lime and pulverized charcoal to the action of a number of separate electric arcs proceeding from charcoal electrodes and crossing each other, substantially as described.

3. The combination of a hopper and a fusing-chamber, the former opening into the latter, a number of pairs of charcoal electrodes projecting into such fusing-chamber and adapted to form electric arcs which cross one another through the mass of material to be decomposed, a perforated support for such material and a collecting vessel beneath it for the reception of the fused mass, substantially as described.

4. The combination with the chamber $a$, of the feed-hopper $a^2$ containing the mixing device, the tubular passages $b$ each provided with a compressor and adapted to receive charcoal, the conducting-linings $b^5$ for the said passages, the generators B having their terminals connected respectively to the linings of diametrically opposite passages, the removable grating $a^5$ forming the lower wall of the said chamber, and the receiver $a^7$ removably secured to the under side of the chamber $a$, all substantially as and for the purpose described.

In testimony whereof I have signed my name to this specification in the presence of two subscribing witnesses.

EDWIN R. WHITNEY.

Witnesses:
  H. J. LIVERMORE,
  NANCY P. FORD.